United States Patent
Viljoen et al.

(10) Patent No.: US 9,992,211 B1
(45) Date of Patent: Jun. 5, 2018

(54) SYSTEMS AND METHODS FOR IMPROVING THE CLASSIFICATION ACCURACY OF TRUSTWORTHINESS CLASSIFIERS

(71) Applicant: Symantec Corporation, Mountain View, CA (US)

(72) Inventors: Petrus Johannes Viljoen, Manhattan Beach, CA (US); Douglas Schlatter, Playa Vista, CA (US); Carey Nachenberg, Manhattan Beach, CA (US); Andrew Gardner, Roswell, GA (US)

(73) Assignee: Symantec Corporation, Mountain View, CA (US)

( * ) Notice: Subject to any disclaimer, the term of this patent is extended or adjusted under 35 U.S.C. 154(b) by 176 days.

(21) Appl. No.: 14/836,991

(22) Filed: Aug. 27, 2015

(51) Int. Cl.
*H04L 29/06* (2006.01)
*G06F 21/56* (2013.01)
*G06N 99/00* (2010.01)

(52) U.S. Cl.
CPC .......... *H04L 63/1416* (2013.01); *G06F 21/56* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 2011/0040825 A1* | 2/2011 | Ramzan | G06F 21/55 709/203 |
| 2012/0054184 A1* | 3/2012 | Masud | G06F 17/30598 707/737 |
| 2013/0276114 A1* | 10/2013 | Friedrichs | G06F 21/56 726/23 |
| 2014/0207518 A1* | 7/2014 | Kannan | G06Q 30/0201 705/7.29 |
| 2015/0121524 A1* | 4/2015 | Fawaz | G06F 21/566 726/23 |
| 2016/0292590 A1* | 10/2016 | Kruglick | G06F 17/30516 |
| 2016/0335432 A1* | 11/2016 | Vatamanu | G06F 21/552 |

(Continued)

OTHER PUBLICATIONS

Sourabh Satish; Systems and Methods for Updating Generic File-Classification Definitions; U.S. Appl. No. 14/210,364, filed Mar. 13, 2014.

*Primary Examiner* — Trang Doan
(74) *Attorney, Agent, or Firm* — FisherBroyles, LLP

(57) ABSTRACT

The disclosed computer-implemented method for improving the classification accuracy of trustworthiness classifiers may include (1) identifying a set of training data that is available for training trustworthiness classifiers used to classify computing resources as clean or malicious, (2) selecting, based at least in part on a characteristic of a specific organization, a subset of training data from the set of training data that is available for training trustworthiness classifiers, (3) training a trustworthiness classifier for the specific organization using the subset of training data selected based at least in part on the characteristic of the specific organization, and then (4) applying the trustworthiness classifier to at least one computing resource encountered by the specific organization to classify the computing resource as clean or malicious. Various other methods, systems, and computer-readable media are also disclosed.

19 Claims, 7 Drawing Sheets

(56) References Cited

U.S. PATENT DOCUMENTS

| | | | |
|---|---|---|---|
| 2016/0337133 A1* | 11/2016 | Yiu | H04L 9/3268 |
| 2016/0352759 A1* | 12/2016 | Zhai | H04L 63/1416 |
| 2017/0026390 A1* | 1/2017 | Sofka | H04L 63/1416 |
| 2017/0032130 A1* | 2/2017 | Joseph Durairaj | G06F 21/552 |
| 2017/0032279 A1* | 2/2017 | Miserendino | G06N 99/005 |

* cited by examiner

SYSTEMS AND METHODS FOR IMPROVING THE CLASSIFICATION ACCURACY OF TRUSTWORTHINESS CLASSIFIERS

BACKGROUND

Trustworthiness classifiers are often used to classify files based at least in part on the files' features. For example, a security software product may apply a trustworthiness classifier to a file encountered by an end user's computing device. In this example, the security software product may compare various features of the file (such as the file's name, path, size, storage location, source, extension, format, and/or creation date) with the trustworthiness classifier. By comparing such features with the trustworthiness classifier, the security software product may be able to fairly accurately classify the file as either clean or malicious.

Unfortunately, traditional trustworthiness classifiers may still lead to false positives and/or false negatives in certain scenarios. For example, a security software vendor may generate a traditional trustworthiness classifier from a broad set of training data that includes known clean and/or malicious files encountered by all organizations and/or individual users that implement the vendor's security software product. However, while the resulting traditional trustworthiness classifier may be broadly tailored for the general clientele of the vendor, this trustworthiness classifier may fail to account for certain nuances of specific organizations within the vendor's clientele. As a result, the traditional trustworthiness classifier may lose some of its accuracy when applied to files encountered by certain organizations within the vendor's clientele.

The instant disclosure, therefore, identifies and addresses a need for systems and methods for improving the classification accuracy of trustworthiness classifiers applied to files encountered by specific organizations.

SUMMARY

As will be described in greater detail below, the instant disclosure describes various systems and methods for improving the classification accuracy of trustworthiness classifiers by selecting subsets of training data based at least in part on certain characteristics of the organizations using the trustworthiness classifiers.

In one example, a computer-implemented method for improving the classification accuracy of trustworthiness classifiers may include (1) identifying a set of training data that is available for training trustworthiness classifiers used to classify computing resources as clean or malicious, (2) selecting, based at least in part on a characteristic of a specific organization, a subset of training data from the set of training data that is available for training trustworthiness classifiers, (3) training a trustworthiness classifier for the specific organization using the subset of training data selected based at least in part on the characteristic of the specific organization, and then (4) applying the trustworthiness classifier to at least one computing resource encountered by the specific organization to classify the computing resource as clean or malicious.

In one example, the set of training data may include data that is collected from a plurality of different organizations. Additionally or alternatively, the set of training data may include data that is specific to a plurality of different organization.

In one example, the method may also include identifying at least one computing resource whose trustworthiness remained unknown for a certain amount of time after having been encountered by at least one organization within the plurality of different organizations. In this example, the method may further include collecting information about the computing resource while the computing resource's trustworthiness remained unknown. Additionally or alternatively, the method may include, after collecting the information about the computing resource, classifying the computing resource as clean or malicious. Moreover, the method may include training the trustworthiness classifier based at least in part on (1) the information about the computing resource collected while the computing resource's trustworthiness remained unknown and (2) the computing resource's classification as clean or malicious.

In one example, the characteristic of the specific organization may include and/or represent a size of the specific organization. In this example, the method may also include selecting the subset of training data by selecting only training data that relates to organizations whose size is within a certain range of the size of the specific organization.

In one example, the characteristic of the specific organization may include and/or represent a relation to the specific organization. In this example, the method may also include selecting the subset of training data by selecting only training data that has the relation to the specific organization.

In one example, the characteristic of the specific organization may include and/or represent an industry of the specific organization. In this example, the method may also include selecting the subset of training data by selecting only training data that relates to organizations whose industry is the same as the industry of the specific organization.

In one example, the characteristic of the specific organization may include and/or represent a geographic region of the specific organization. In this example, the method may also include selecting the subset of training data by selecting only training data that relates to organizations whose geographic region is the same as the geographic region of the specific organization.

In one example, the subset of training data may identify static features of known clean and malicious computing resources. In this example, the method may also include training the trustworthiness classifier based at least in part on the static features of the known clean and malicious computing resources and then determining, by applying the trustworthiness classifier to the computing resource, that the computing resource is likely malicious. Additionally or alternatively, the method may include substantiating that the computing resource is likely malicious by observing at least one suspicious run-time behavior of the computing resource while running within a software automation environment.

In one example, the method may also include providing the specific organization with the trustworthiness classifier to enable the specific organization to classify the computing resource as clean or malicious using the trustworthiness classifier. In another example, the method may also include applying the trustworthiness classifier to at least one computing resource encountered by another organization that shares the characteristic in common with the specific organization.

In one example, the method may also include identifying at least one computing resource whose trustworthiness is currently unknown. In this example, the method may further include receiving, from the specific organization, a notification indicating that the computing resource is either clean or malicious. Additionally or alternatively, the method may include updating the trustworthiness classifier by retraining the trustworthiness classifier to account for the computing resource being either clean or malicious based at least in part on the notification from the specific organization.

In some examples, a system for implementing the above-described method may include (1) an identification module, stored in memory, that identifies a set of training data that is available for training trustworthiness classifiers used to classify computing resources as clean or malicious, (2) a selection module, stored in memory, that selects, based at least in part on a characteristic of a specific organization, a subset of training data from the set of training data that is available for training trustworthiness classifiers, (3) a training module, stored in memory, that trains a trustworthiness classifier for the specific organization using the subset of training data selected based at least in part on the characteristic of the specific organization, (4) a classification module, stored in memory, that applies the trustworthiness classifier to at least one computing resource encountered by the specific organization to classify the computing resource as clean or malicious, and (5) at least one physical processor configured to execute the identification module, selection module, the training module, and the classification module.

In some examples, the above-described method may be encoded as computer-readable instructions on a non-transitory computer-readable medium. For example, a computer-readable medium may include one or more computer-executable instructions that, when executed by at least one processor of a computing device, cause the computing device to (1) identify a set of training data that is available for training trustworthiness classifiers used to classify computing resources as clean or malicious, (2) select, based at least in part on a characteristic of a specific organization, a subset of training data from the set of training data that is available for training trustworthiness classifiers, (3) train a trustworthiness classifier for the specific organization using the subset of training data selected based at least in part on the characteristic of the specific organization, and then (4) apply the trustworthiness classifier to at least one computing resource encountered by the specific organization to classify the computing resource as clean or malicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
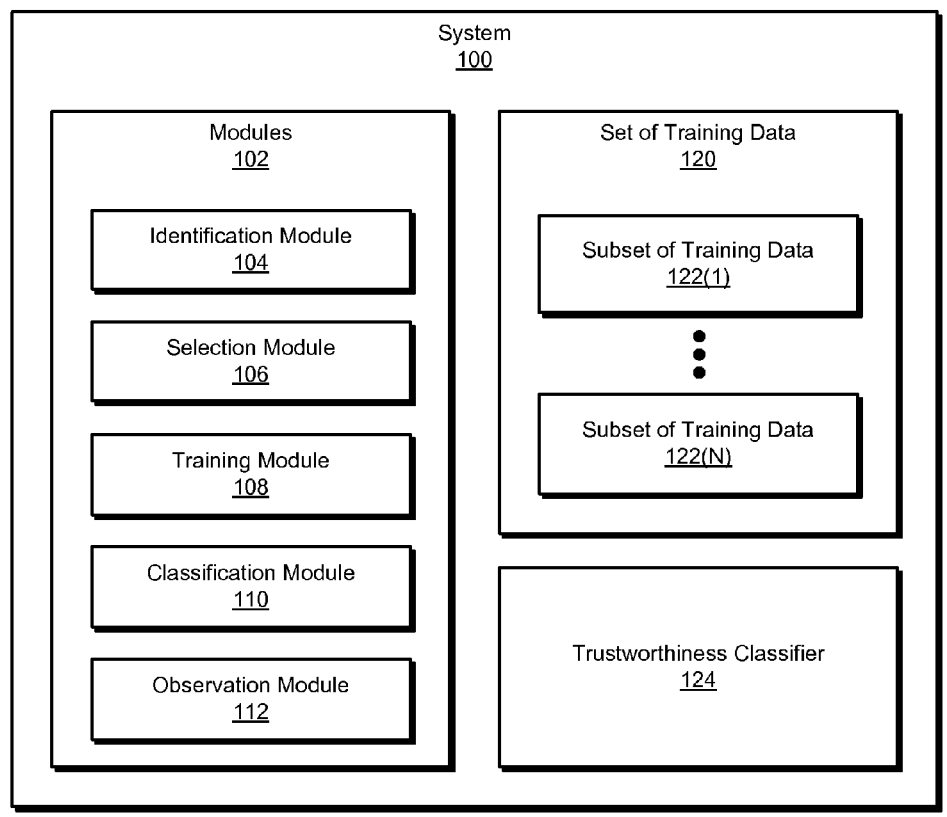
FIG. 1 is a block diagram of an exemplary system for improving the classification accuracy of trustworthiness classifiers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for improving the classification accuracy of trustworthiness classifiers. As will be explained in greater detail below, by selecting a vector specific to a certain organization from a security software vendor's total available training data, the systems and methods described herein may be able to train a trustworthiness classifier that is specifically tailored to that organization using the selected vector from the security software vender's training data. Accordingly, by training the trustworthiness classifier in this way, the systems and methods described herein may be able to improve and/or increase the classification accuracy of the trustworthiness classifier, thereby reducing the number of false positives and/or false negatives, when compared to a traditional classifier trained using the security software vendor's total available training data.

The following will provide, with reference to FIGS. 1, 2, 4, and 5, detailed descriptions of exemplary systems for improving the classification accuracy of trustworthiness classifiers. Detailed descriptions of corresponding computer-implemented methods will be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for improving the classification accuracy of trustworthiness classifiers. As illustrated in this figure, exemplary system 100 may include one or more modules 102 for performing one or more tasks. For example, and as will be explained in greater detail below, exemplary system 100 may include an identification module 104 that identifies a set of training data that is available for training trustworthiness classifiers used to classify computing resources as clean or malicious. Exemplary system 100 may also include a selection module 106 that selects, based at least in part on a characteristic of a specific organization, a subset of training data from the set of training data that is available for training trustworthiness classifiers. Moreover, exemplary system 100 may include a training module 108 that trains a trustworthiness classifier for the specific organization using the subset of training data selected based at least in part on the characteristic of the specific organization.

In addition, and as will be described in greater detail below, exemplary system 100 may include a classification module 110 that applies the trustworthiness classifier to at least one computing resource encountered by the specific organization to classify the computing resource as clean or malicious. Exemplary system 100 may further include an observation module 112 that substantiates that the computing resource is likely malicious by observing at least one suspicious run-time behavior of the computing resource while running within a software automation environment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include certain training data, such as set of training data 120. In one example, set of training data 120 may include subsets of training data 122(1)-(N). Although illustrated as discrete entities in FIG. 2, subsets of training data 122(1)-(N) may have certain overlap and/or share data in common with one another.

In this example, set of training data 120 may include certain known computing resources labelled as clean, malicious, somewhere in-between clean or malicious, and/or unknown. For example, set of training data 120 may identify a file as having a trustworthiness score of 50% indicating that the file's trustworthiness is somewhere in-between definitely clean and definitely malicious. Additionally or alternatively, set of training data 120 may include information about such known files and/or identify certain features, characteristics, attributes, and/or behaviors of such known files. Examples of training data 120 include and/or identify, without limitation, labelled files, static features of files, run-time behaviors of files, file names, file paths, file sizes, storage locations of files, sources of files, authors of files, processes that created certain files, trustworthiness classifications of files, file extensions, file formats, file entropy, the number of extensions of files, the number of non-alphanumeric characters in file names, whether files are signed, the prevalence of files, the age of files, the creation date of files, other labelled computing resources (such as labelled Internet Protocol (IP) addresses, labelled Uniform Resource Locators (URLs), labelled employee personal data, etc.), other information about such computing resources (such as static features of the computing resources, paths to the computing resources, authors of the computing resources, etc.), variations of one or more of the same, combinations of one or more of the same, or any other suitable training data.

As illustrated in FIG. 1, exemplary system 100 may also include one or more trustworthiness classifiers, such as trustworthiness classifier 124. The term "trustworthiness classifier," as used herein, generally refers to any type or form of algorithm, tool, and/or model capable of classifying the trustworthiness of computing resources. In one embodiment, trustworthiness classifier 124 may include and/or identify a plurality of features used to classify the trustworthiness of files. Examples of trustworthiness classifier 124 include, without limitation, signatures, generic definitions, heuristics, classifiers, data clusters, perceptrons, decision trees, combinations of one or of the same, or any other suitable trustworthiness classifier.

In one example, trustworthiness classifier 124 may be generated and/or trained using at least a portion of training data 120. For example, training module 108 may train trustworthiness classifier 124 using subset of training data 122(1). Additionally or alternatively, training module 108 may train trustworthiness classifier 124 using subset of training data 122(N).

Figure 2:
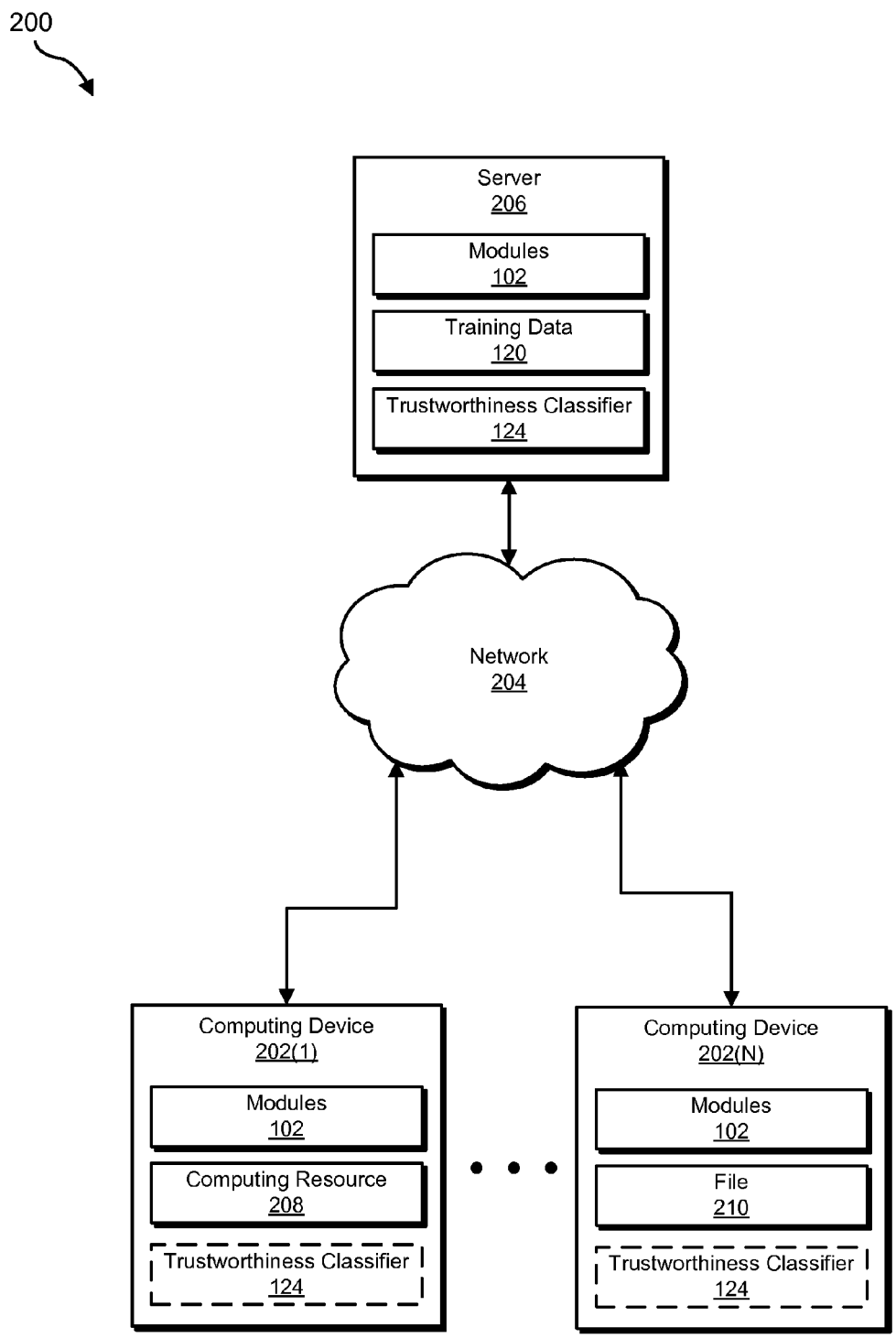
FIG. 2 is a block diagram of an additional exemplary system for improving the classification accuracy of trustworthiness classifiers.

Exemplary system 100 in FIG. 1 may be implemented in a variety of ways. For example, all or a portion of exemplary system 100 may represent portions of exemplary system 200 in FIG. 2. As shown in FIG. 2, system 200 may include one or more of computing devices 202(1)-(N) in communication with a server 206 via a network 204. In one example, one or more of computing device 202(1)-(N) may be programmed with one or more of modules 102 and/or may store all or a portion of training data 120. Additionally or alternatively, server 206 may be programmed with one or more of modules 102 and/or may store all or a portion of training data 120.

As shown in FIG. 2, computing device 202(1) may encounter a computing resource 208. In one example, computing resource 208 may represent a portion of training data 120 and/or may be accounted for in training data 120. Additionally or alternatively, computing resource 208 may undergo a trustworthiness analysis involving the application of trustworthiness classifier 124.

Similarly, computing device 202(N) may encounter a file 210. In one example, file 210 may represent a portion of training data 120 and/or may be accounted for in training data 120. Additionally or alternatively, file 210 may undergo a trustworthiness analysis involving the application of trustworthiness classifier 124.

In one embodiment, one or more of modules 102 from FIG. 1 may, when executed by at least one processor of one or more of computing devices 202(1)-(N) and/or server 206, enable one or more of computing devices 202(1)-(N) and/or server 206 to improve the classification accuracy of trustworthiness classifiers. For example, and as will be described in greater detail below, one or more of modules 102 may cause one or more of computing devices 202(1)-(N) and/or server 206 to (1) identify set of training data 120 that is available for training trustworthiness classifiers used to classify computing resources as clean or malicious, (2) select, based at least in part on a characteristic of a specific organization, a subset of training data 122(1) from set of training data 120 that is available for training trustworthiness classifiers, (3) train trustworthiness classifier 124 for the specific organization using subset of training data 122(1) selected based at least in part on the characteristic of the specific organization, and then (4) apply trustworthiness classifier 124 to at least one computing resource (e.g., computing resource 208 and/or file 210) encountered by the specific organization to classify the file as clean or malicious.

Computing devices 202(1)-(N) generally represents any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing devices.

Server 206 generally represents any type or form of computing device capable of aggregating training data, training trustworthiness classifiers using training data, and/or distributing trained trustworthiness classifiers. Examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication among computing devices 202(1)-(N) and server 206.

Computing resource 208 generally represents any type or form of physical and/or virtual computing component or object. Examples of computing resource 208 include, without limitation, files, IP addresses, URLs, personal data (e.g., employee information), computing devices, variations of one or more of the same, combinations of one or more of the same, or any other suitable computing resource.

Figure 3:
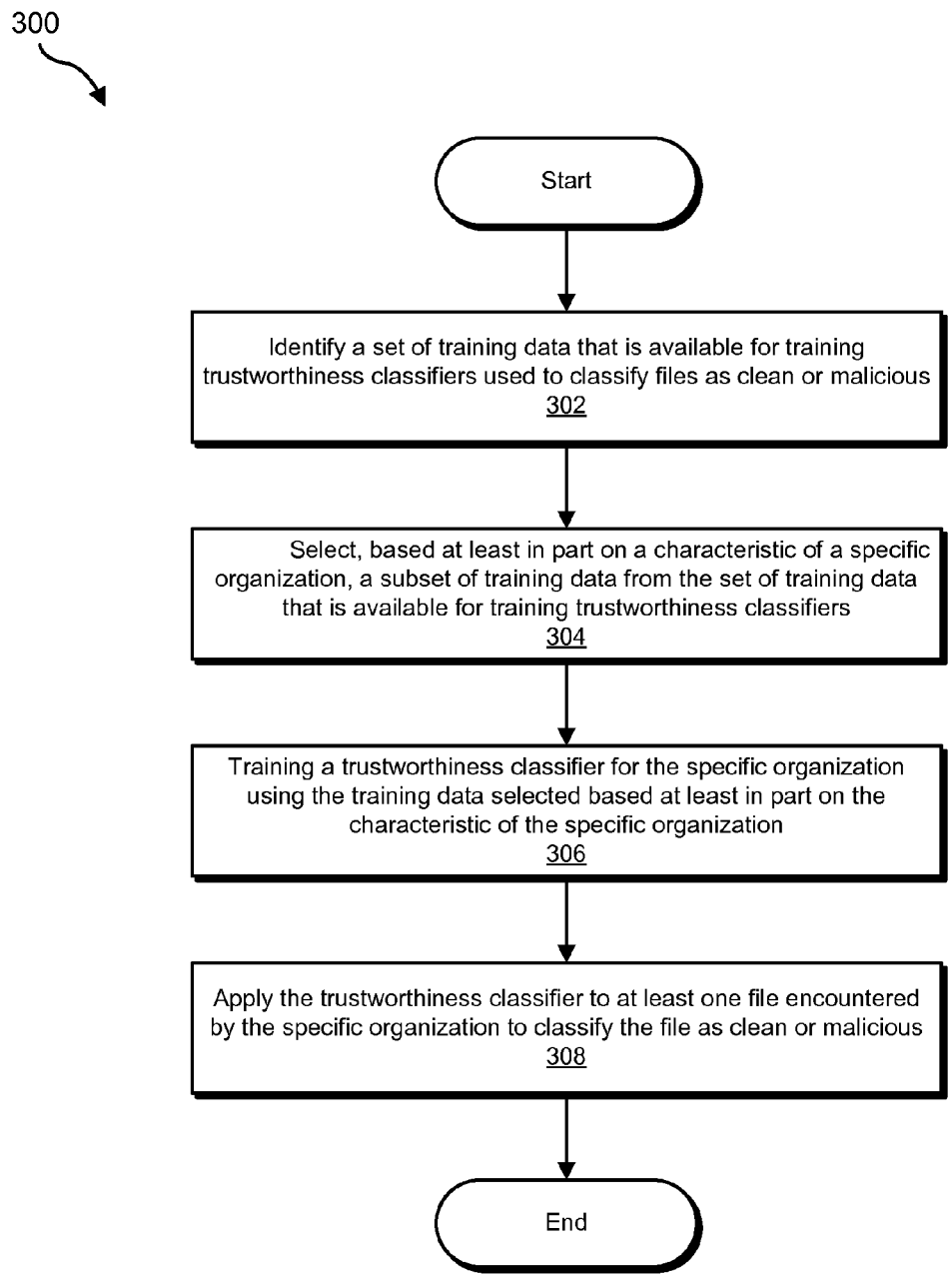
FIG. 3 is a flow diagram of an exemplary method for improving the classification accuracy of trustworthiness classifiers.

FIG. 3 is a flow diagram of an exemplary computer-implemented method 300 for improving the classification accuracy of trustworthiness classifiers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a set of training data that is available for training trustworthiness classifiers used to classify computing resources as clean or malicious. For example, identification module 104 may, as part of server 206 and/or computing devices 202(1)-(N) in FIG. 2, identify set of training data 120 that is available for training trustworthiness classifiers used to classify computing resources as clean or malicious. In this example, set of training data 120 may include and/or represent data collected from various computing devices and/or organizations that subscribe to and/or implement a security vendor's security software product. Additionally or alternatively, set of training data 120 may include and/or represent data that is specific to such computing devices and/or organizations that subscribe to and/or implement the security vendor's security software product.

The systems described herein may perform step 302 in a variety of ways and/or contexts. In one example, identification module 104 may identify set of training data 120 by collecting set of training data 120 from one or more computing devices. For example, identification module 104 may direct server 206 to obtain and/or receive portions of training data 120 from computing devices 202(1)-(N) via network 204. In other words, server 206 may collect one portion of training data 120 from computing device 202(1) and another portion of training data 120 from computing device 202(N). As server 206 obtains and/or receives portions of training data 120 in this way, identification module 104 may identify these portions of training data 120.

In another example, identification module 104 may direct computing device 202(1) to obtain portions of training data 120 from server 206 via network 204. For example, identification module 104 may collect one portion of training data 120 from server 206 and another portion of training data 120 from computing device 202(N) and/or a web server (not necessarily illustrated in FIG. 2).

In one example, computing devices 202(1)-(N) may represent and/or belong to a single organization that subscribes to and/or implements a security vendor's security software product. Additionally or alternatively, computing devices 202(1)-(N) may represent and/or belong to a plurality of organizations that subscribe to and/or implement a security vendor's security software product. For example, computing devices 202(1) may represent and/or belong to one organization, and computing devices 202(N) may represent and/or belong to another organization.

As a specific example, identification module 104 may direct a security software vendor's server to collect large amounts of data about encountered files from computing devices operated by the vendor's customers. In this example, the vendor's customers may include banks, high technology companies, small businesses, aerospace companies, automotive companies, and government entities, among others. As the vendor's server collects these large amounts of data from those customers, identification module 104 may identify the data and/or add the data to the vendor's training data that is available for training trustworthiness classifiers.

Returning to FIG. 3, at step 304 one or more of the systems described herein may select a subset of training data from the set of training data based at least in part on a characteristic of a specific organization. For example, selection module 106 may, as part of server 206 and/or computing devices 202(1)-(N) in FIG. 2, select subset of training data 122(1) from set of training data 120 based at least in part on a characteristic of a specific organization. In this example, by selecting subset of training data 122(1) in this way, selection module 106 may effectively exclude subset of training data 122(N) from the training process since subset of training data 122(N) does not capture and/or represent the characteristic of the specific organization. Examples of such characteristics of the specific organization include, without limitation, the size of the specific organization, the relation of certain files to the specific organization, the industry of the specific organization, the geographic region of the specific organization, variations of one or more of the same, combinations of one or more of the same, or any other suitable vectors of training data.

The systems described herein may perform step 304 in a variety of ways and/or contexts. In one example, selection module 106 may select subset of training data 122(1) upon determining that subset of training data 122(1) includes only data that captures and/or represents a certain characteristic that leads to improved classification accuracy in trustworthiness classifiers for the specific organization. For example, the security software vendor may analyze the accuracy of trustworthiness classifiers trained using certain vectors of training data 120. Examples of such vectors include, without limitation, training data related to organizations of a certain size, training data that originates from or was encountered by particular organizations, training data related to organizations of a certain industry, training data related to organizations headquartered in and/or operating primarily in a certain geographic region, variations of one or more of the same, combinations of one or more of the same, or any other suitable vectors of training data.

In one example, the security software vendor may determine that trustworthiness classifiers applied by some organizations achieve improved and/or increased accuracy when trained using only training data related to organizations of similar size. For example, the specific organization may represent a large enterprise with 50,000 employees. In this example, observation module 112 may determine that trustworthiness classifiers applied by organizations whose employees reach numbers between 45,000 and 55,000 are more accurate when trained using only training data related to organizations of the same size range (as opposed to using all of the available training data). As a result, selection module 106 may select only the training data related to organizations whose employees reach numbers between 45,000 and 55,000 (e.g., subset of training data 122(1)) for training trustworthiness classifier 124.

In one example, the security software vendor may determine that trustworthiness classifiers applied by some organizations achieve improved and/or increased accuracy when trained using only training data related to those organizations themselves. For example, the specific organization may represent an investment banking firm. In this example, observation module 112 may determine that trustworthiness classifiers applied by some organizations are more accurate when trained using only training data related to those organizations themselves (as opposed to using all of the available training data). As a result, selection module 106 may select only the training data related to the investment banking firm itself (e.g., subset of training data 122(1)) for training trustworthiness classifier 124.

In one example, the security software vendor may determine that trustworthiness classifiers applied by some organizations of a certain industry achieve improved and/or increased accuracy when trained using only training data related to organizations of that same industry. For example, the specific organization may represent an aerospace company. In this example, observation module 112 may determine that trustworthiness classifiers applied by organizations in a particular industry are more accurate when trained using only training data related to organizations in that same industry. As a result, selection module 106 may select only the training data related to organizations in the aerospace industry (e.g., subset of training data 122(1)) for training trustworthiness classifier 124.

In one example, the security software vendor may determine that trustworthiness classifiers applied by some organizations achieve improved and/or increased accuracy when trained using only training data related to organizations within the same geographic region. For example, the specific organization may represent a company headquartered in and/or operating primarily in North America. In this example, observation module 112 may determine that trustworthiness classifiers applied by organizations headquartered in and/or operating primarily in North America are more accurate when trained using only training data related to organizations within the same geographic region (as opposed to using all of the available training data). As a result, selection module 106 may select only the training data related to organizations headquartered in and/or operating primarily in North America (e.g., subset of training data 122(1)) for training trustworthiness classifier 124.

In one example, the security software vendor may determine that trustworthiness classifiers applied by some organizations achieve improved and/or increased accuracy when trained using a combination of training data vectors. For example, the specific organization may represent a large enterprise with 80,000 employees in the high technology computer industry. In this example, observation module 112 may determine that trustworthiness classifiers applied by organizations in a particular industry whose employees reach numbers between 75,000 and 100,000 are more accurate when trained using only training data related to organizations of the same size range in that same industry (as opposed to using all of the available training data). As a result, selection module 106 may select only the training data related to organizations in the high technology computer industry whose employees reach numbers between 75,000 and 100,000 (e.g., subset of training data 122(1)) for training trustworthiness classifier 124.

Training data may be related to an organization in variety of ways. For example, training data that originates from an organization may be related to that organization. Additionally or alternatively, training data encountered and/or detected by an organization may be related to that organization.

Returning to FIG. 3, at step 306 one or more of the systems described herein may train a trustworthiness classifier for the specific organization using the subset of training data selected based at least in part on the characteristic of the specific organization. For example, training module 108 may, as part of server 206 and/or computing devices 202(1)-(N) in FIG. 2, train trustworthiness classifier 124 for the specific organization using subset of training data 122(1) selected based at least in part on the characteristic of the specific organization. In this example, by training trustworthiness classifier 124 in this way, training module 108 may effectively exclude subset of training data 122(N) from the training process since subset of training data 122(N) does not capture and/or represent the characteristic of the specific organization.

The systems described herein may perform step 306 in a variety of ways and/or contexts. In one example, training module 108 may train trustworthiness classifier 124 by applying at least one statistical and/or machine learning algorithm to fit trustworthiness classifier 124 to subset of training data 122(1). Examples of such a statistical and/or machine learning algorithm include, without limitation, supervised learning algorithms, Lloyd's algorithm, Voronoi interaction, linear regression, the perceptron algorithm, neural networking, regression trees, variations of one or more of the same, combinations of one or more of the same, or any other suitable statistical algorithms.

In one example, training module 108 may train trustworthiness classifier 124 by applying certain features of known clean and/or malicious files included in subset of training data 122(1) to trustworthiness classifier 124. For example, training module 108 may identify various content within subset of training data 122(1). Such content may include static features of files labelled clean, malicious, and/or somewhere in-between clean or malicious. In this example, training module 108 may construct a decision tree that corresponds to and/or represents the content identified within subset of training data 122(1). Training module 108 may update this decision tree in an iterative process and/or on a fairly regular basis to account for new files and/or new information represented in subset of training data 122(1).

In some examples, set of training data 120 may become more meaningful and/or insightful with the passing of time and/or from a historical perspective. For example, identification module 104 may first identify a file included in training data 120 at a first point in time. In this example, the trustworthiness of the file may have been unknown at the first point in time and remained that way until identification module 104 is able to identify additional information about the file. After the identification of that additional information about the file, classification module 110 may be able to classify the file as clean or malicious (with increased confidence) at a second point in time. As a result, the portion of set of training data 120 that relates to this file may be more meaningful and/or insightful with respect to classifier training at the second point in time than at the first point in time.

As an example, one of the organizations that subscribes to and/or implements the security vendor's security software product may identify and/or encounter a file whose trustworthiness is unknown at a first point in time. In this example, identification module 104 may collect various information about the file while the file's trustworthiness remains unknown. After identification module 104 has collected sufficient information about the file, classification module 110 may be able to classify the file as clean or malicious at a second point in time based at least in part on the collected information. Training module 108 may then train trustworthiness classifier 124 based at least in part on (1) the information about the file collected while the file's trustworthiness remained unknown and (2) the file's ultimate classification as either clean or malicious.

Returning to FIG. 3, at step 308 one or more of the systems described herein may apply the trustworthiness classifier to at least one file encountered by the specific organization to classify the file as clean or malicious. For example, classification module 110 may, as part of server 206 and/or computing devices 202(1)-(N) in FIG. 2, apply trustworthiness classifier 124 to at least one computing resource (e.g., computing resource 208 and/or file 210) encountered by the specific organization to classify the computing resource as clean or malicious. Additionally or alternatively, classification module 110 may assign a certain confidence level and/or score to the computing resource in connection with the computing resource's classification as clean or malicious.

The systems described herein may perform step 308 in a variety of ways and/or contexts. In one example, classification module 110 may apply trustworthiness classifier 124 to a file at computing device 202. Additionally or alternatively, classification module 110 may apply trustworthiness classifier 124 to a file at server 206.

Figure 4:
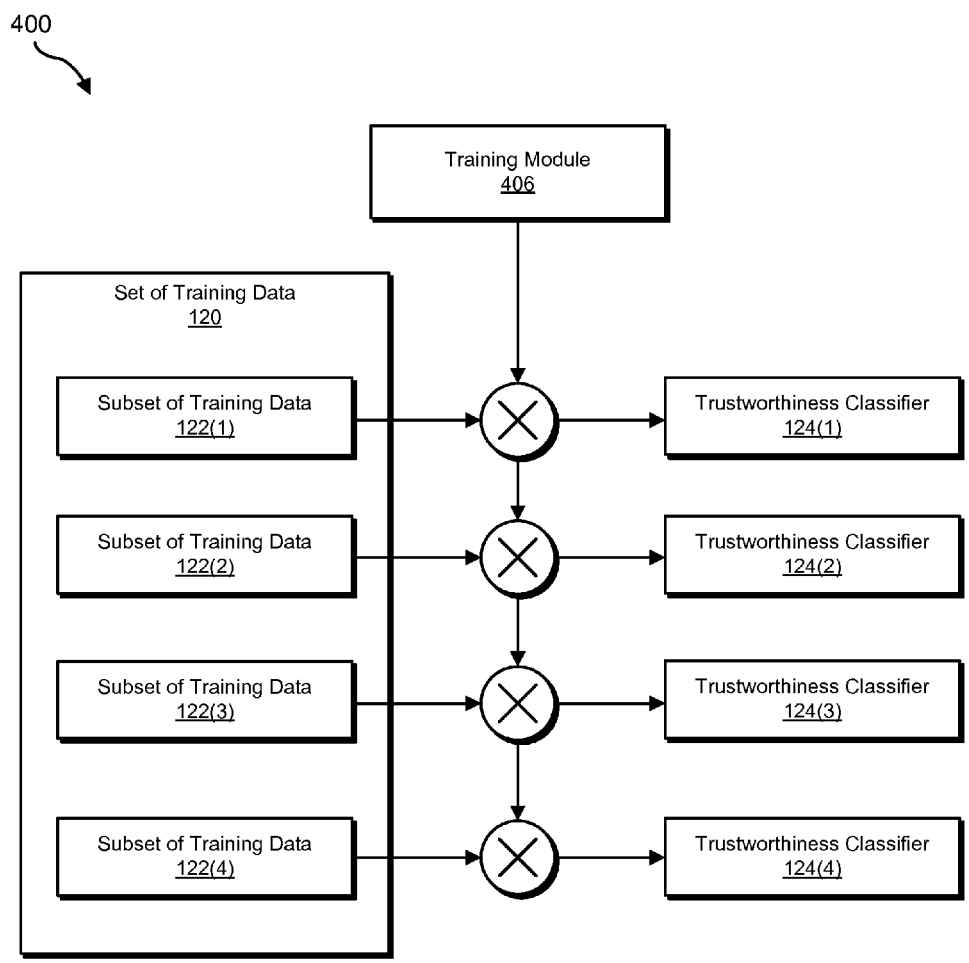
FIG. 4 is block diagram of another exemplary system for improving the classification accuracy of trustworthiness classifiers.
Figure 5:
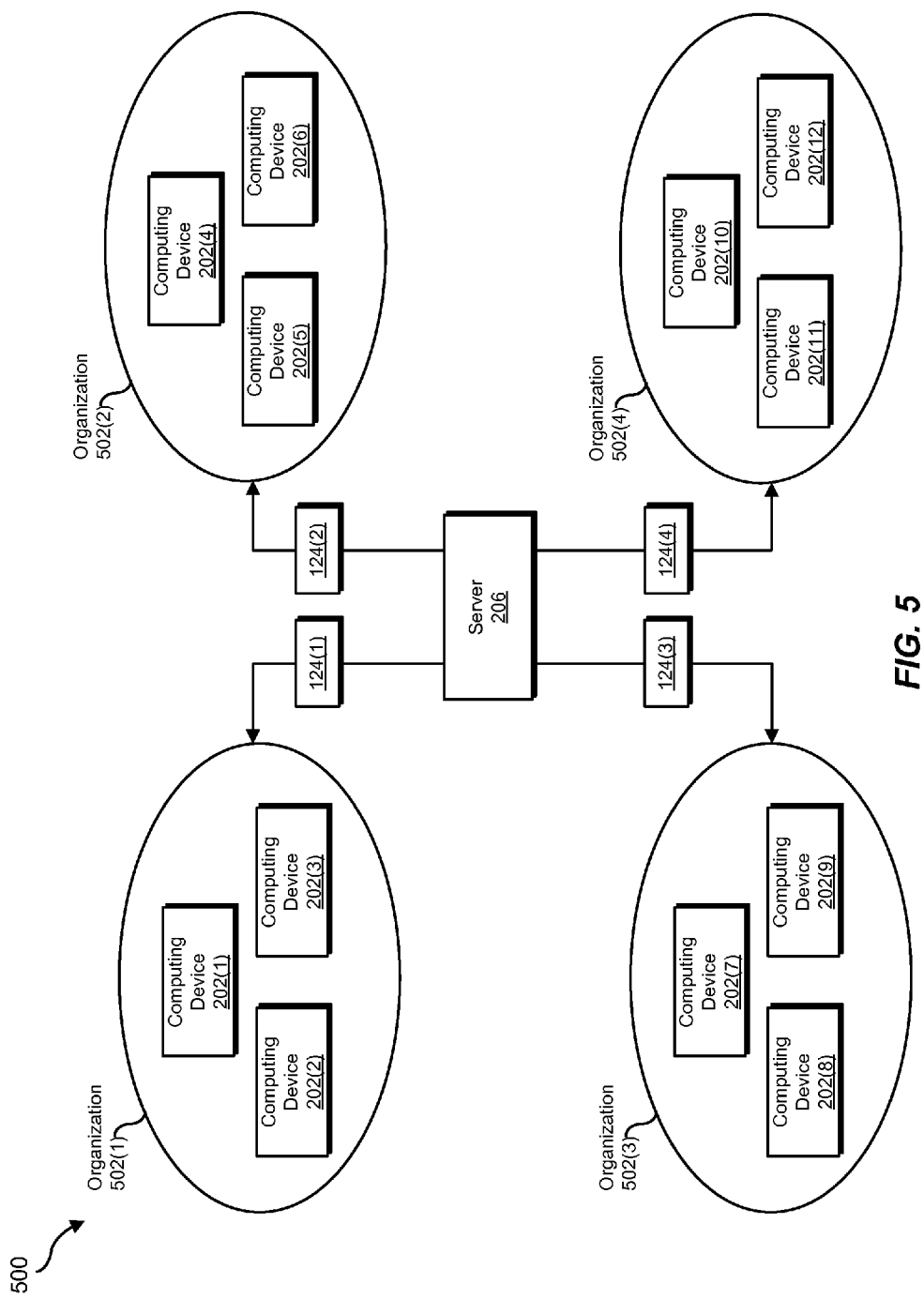
FIG. 5 is block diagram of a further exemplary system for improving the classification accuracy of trustworthiness classifiers.

In one example, classification module 110 may provide the specific organization with trustworthiness classifier 124 to enable the specific organization to classify a file as clean or malicious using trustworthiness classifier 124. As a specific example, FIG. 4 illustrates an exemplary system 400 that trains a plurality of trustworthiness classifiers 124(1), 124(2), 124(3), and 124(4), and FIG. 5 illustrates an exemplary system 500 that distributes trustworthiness classifiers 124(1)-(4) to organizations 502(1), 502(2), 502(3), and 502(4), respectively. In this example, training module 108 may train trustworthiness classifier 124(1) in FIG. 4 using subset of training data 122(1) in FIG. 4 and trustworthiness classifier 124(2) in FIG. 4 using subset of training data 122(2) in FIG. 4. Similarly, training module 108 may train trustworthiness classifier 124(3) in FIG. 4 using subset of training data 122(3) in FIG. 4 and trustworthiness classifier 124(4) in FIG. 4 using subset of training data 122(4) in FIG. 4.

Upon completion of a training process, classification module 110 and/or server 206 may distribute the corresponding trustworthiness classifier to the organization for which the trustworthiness classifier was trained. For example, server 206 in FIG. 5 may send trustworthiness classifier 124(1) to organization 502(1) that includes computing devices 202(1), 202(2), and 202(3), among others. In this example, trustworthiness classifier 124(1) may have been trained specifically for organization 502(1) using a strategically selected vector of training data 120. Upon receiving trustworthiness classifier 124(1), organization 502(1) may apply trustworthiness classifier 124(1) to unknown files (encountered by, e.g., computing devices 202(1)-(3)) to classify such files as clean or malicious.

Similarly, server 206 in FIG. 5 may send trustworthiness classifier 124(2) to organization 502(2) that includes computing devices 202(4), 202(5), and 202(6), among others. In this example, trustworthiness classifier 124(2) may have been trained specifically for organization 502(2) using a strategically selected vector of training data 120. Upon receiving trustworthiness classifier 124(2), organization 502(2) may apply trustworthiness classifier 124(2) to unknown files (encountered by, e.g., computing devices 202(4)-(6)) to classify such files as clean or malicious.

Continuing with this example, server 206 in FIG. 5 may send trustworthiness classifier 124(3) to organization 502(3) that includes computing devices 202(7), 202(8), and 202(9), among others. In this example, trustworthiness classifier 124(3) may have been trained specifically for organization 502(3) using a strategically selected vector of training data 120. Upon receiving trustworthiness classifier 124(3), organization 502(3) may apply trustworthiness classifier 124(3) to unknown files (encountered by, e.g., computing devices 202(7)-(9)) to classify such files as clean or malicious.

Finally, server 206 in FIG. 5 may send trustworthiness classifier 124(4) to organization 502(4) that includes computing devices 202(10), 202(11), and 202(12), among others. In this example, trustworthiness classifier 124(4) may have been trained specifically for organization 502(4) using a strategically selected vector of training data 120. Upon receiving trustworthiness classifier 124(4), organization 502(4) may apply trustworthiness classifier 124(4) to unknown files (encountered by, e.g., computing devices 202(10)-(12)) to classify such files as clean or malicious.

In some examples, the systems and methods described herein may strengthen the confidence in classifications made by trustworthiness classifiers based at least in part on additional information identified after the classifications. For example, classification module 110 may classify a file as suspicious and/or likely malicious based at least in part on the result of applying trustworthiness classifier 124 to the file. After the classification of this file, server 206 may set the file to run within a software automation environment (sometimes referred to as a "sandbox") to observe whether the file exhibits any suspicious and/or malicious run-time behaviors.

While the file is running within the software automation environment, observation module 112 may observe some suspicious and/or malicious run-time behaviors exhibited by the file. As a result, observation module 112 may be able to substantiate and/or corroborate that the file's classification as suspicious and/or likely malicious based at least in part on this observation of the file's suspicious and/or malicious run-time behaviors. Additionally or alternatively, observation module 112 may be able to strengthen the confidence of the file's classification (by, e.g., raising the classification to definitely malicious) based at least in part on the observation of the file's suspicious and/or malicious run-time behaviors.

In some examples, training module 108 may update trustworthiness classifiers based at least in part on additional information identified after their creation. For example, training module 108 may have initially trained trustworthiness classifier 124 using training data that included a file whose trustworthiness was initially unknown and/or incorrect (e.g., a false positive or a false negative). In this example, the specific organization or another organization using trustworthiness classifier 124 may gain certain insight into the trustworthiness of the file beyond the result yielded by applying trustworthiness classifier 124 to the file.

As an example, the specific organization or the other organization may discover that the file whose trustworthiness was initially unknown is actually either clean or malicious. As another example, the specific organization or the other organization may discover that the file whose trustworthiness was initially clean is actually malicious (or vice versa). As a result, the specific organization or the other organization may notify the security software vendor of that discovery. In response to the security software vendor's receipt of the notification, training module 108 may retrain trustworthiness classifier 124 to account for the file being either clean or malicious in accordance with the notification.

In one example, classification module 110 and/or server 206 may distribute trustworthiness classifier 124 to other organizations besides the specific organization. In other words, classification module 110 and/or server 206 may distribute trustworthiness classifier 124 to a different organization than the one for which trustworthiness classifier 124 was initially trained. For example, classification module 110 and/or server 206 may distribute trustworthiness classifier 124 to an organization that shares the characteristic in common with the specific organization. As a specific example, in the event that the specific organization represents an investment banking firm, classification module 110 may distribute trustworthiness classifier 124 to another investment banking firm and/or apply trustworthiness classifier 124 to files encountered by another investment banking firm.

Figure 6:
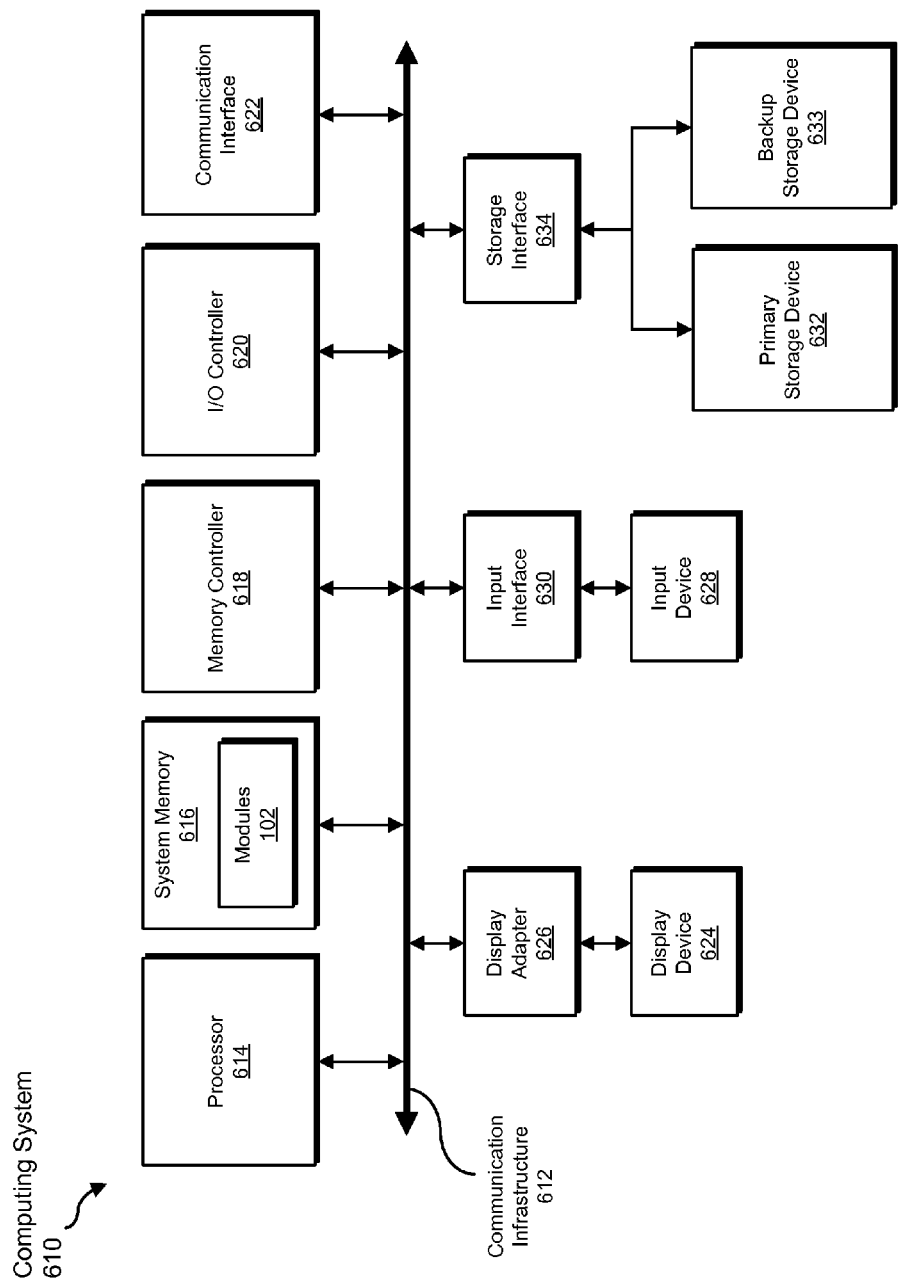
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
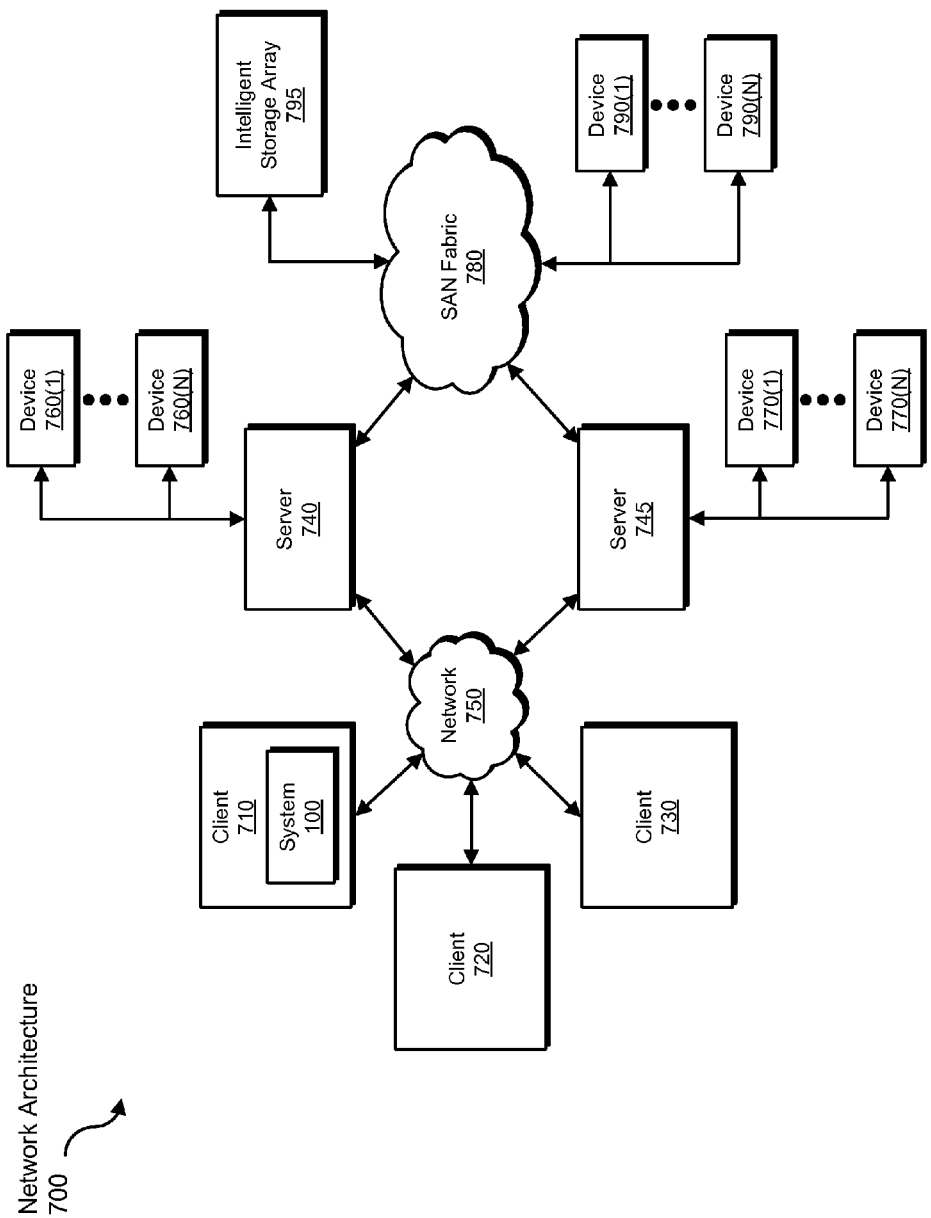
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for improving the classification accuracy of trustworthiness classifiers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive training data and/or a classifier to be transformed, transform the training data and/or classifier, output a result of the transformation to train the classifier based on the training data, use the result of the transformation to classify files based on the classifier, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving the classification accuracy of trustworthiness classifiers, at least a portion of the method being performed by a computing device comprising at least one processor, the method comprising:
    identifying a set of training data that is available for training trustworthiness classifiers used by a security software product to classify computing resources as clean or malicious, wherein:
        the set of training data comprises at least one of:
            data that is collected from a plurality of different organizations; and
            data that is specific to a plurality of different organizations;
        identifying the set of training data comprises:
            identifying at least one computing resource whose trustworthiness remained unknown for a certain amount of time after having been encountered by at least one organization within the plurality of different organizations;
            collecting information about the computing resource while the computing resource's trustworthiness remained unknown; and
            after collecting the information about the computing resource, classifying the computing resource as clean or malicious;
    identifying a specific organization whose computing systems implement the security software product;
    selecting, based at least in part on a characteristic of the specific organization, a subset of training data from the set of training data that is available for training trustworthiness classifiers;
    training a trustworthiness classifier for the specific organization using:
        the subset of training data selected based at least in part on the characteristic of the specific organization;

the information about the computing resource collected while the computing resource's trustworthiness remained unknown; and the computing resource's classification as clean or malicious; and applying, by way of the security software product, the trustworthiness classifier to at least one computing resource encountered by the specific organization to classify the computing resource as clean or malicious.

2. The method of claim 1, wherein:
the characteristic of the specific organization comprises a size of the specific organization; and
selecting the subset of training data comprises selecting only training data that relates to organizations whose size is within a certain range of the size of the specific organization.

3. The method of claim 1, wherein:
the characteristic of the specific organization comprises a relation to the specific organization; and
selecting the subset of training data comprises selecting only training data that has the relation to the specific organization.

4. The method of claim 1, wherein:
the characteristic of the specific organization comprises an industry of the specific organization; and
selecting the subset of training data comprises selecting only training data that relates to organizations whose industry is the same as the industry of the specific organization.

5. The method of claim 1, wherein:
the characteristic of the specific organization comprises a geographic region of the specific organization; and
selecting the subset of training data comprises selecting only training data that relates to organizations whose geographic region is the same as the geographic region of the specific organization.

6. The method of claim 1, wherein:
the subset of training data identifies static features of known clean and malicious computing resources;
training the trustworthiness classifier comprises training the trustworthiness classifier based at least in part on the static features of the known clean and malicious computing resources; and
applying the trustworthiness classifier to the computing resource encountered by the specific organization comprises determining, by applying the trustworthiness classifier to the computing resource, that the computing resource is likely malicious; and
further comprising substantiating that the computing resource is likely malicious by observing at least one suspicious run-time behavior of the computing resource while running within a software automation environment.

7. The method of claim 1, wherein applying the trustworthiness classifier to the computing resource encountered by the specific organization comprises providing the specific organization with the trustworthiness classifier to enable the specific organization to classify the computing resource as clean or malicious using the trustworthiness classifier.

8. The method of claim 1, further comprising:
identifying at least one computing resource whose trustworthiness is currently unknown;
receiving, from the specific organization, a notification indicating that the computing resource is either clean or malicious; and
updating the trustworthiness classifier by retraining the trustworthiness classifier to account for the computing resource being either clean or malicious based at least in part on the notification from the specific organization.

9. The method of claim 1, wherein applying the trustworthiness classifier to the computing resource encountered by the specific organization comprises applying the trustworthiness classifier to at least one computing resource encountered by another organization that shares the characteristic in common with the specific organization.

10. The method of claim 1, wherein the specific organization comprises a business.

11. A system comprising:
an identification module, stored in memory, that:
identifies a set of training data that is available for training trustworthiness classifiers used by a security software product to classify computing resources as clean or malicious; and
identifies a specific organization whose computing systems implement the security software product;
a selection module, stored in memory, that selects, based at least in part on the characteristic of a specific organization, a subset of training data from the set of training data that is available for training trustworthiness classifiers, wherein the subset of training data identifies static features of known clean and malicious computing resources;
a training module, stored in memory, that trains a trustworthiness classifier for the specific organization using:
the subset of training data selected based at least in part on the characteristic of the specific organization; and
the static features of the known clean and malicious computing resources;
a classification module, stored in memory, that:
applies the trustworthiness classifier via the security software product to at least one computing resource encountered by the specific organization to classify the computing resource as clean or malicious; and
determines, by applying the trustworthiness classifier to the computing resource, that the computing resource is likely malicious;
an observation module, stored in memory, that substantiates that the computing resource is likely malicious by observing at least one suspicious run-time behavior of the computing resource while running within a software automation environment; and
at least one physical processor configured to execute the identification module, the selection module, the training module, and the classification module.

12. The system of claim 11, wherein the set of training data comprises at least one of:
data that is collected from a plurality of different organizations; and
data that is specific to a plurality of different organizations.

13. The system of claim 12, wherein:
the identification module identifies the set of training data that is available for training trustworthiness classifiers by:
identifying at least one computing resource whose trustworthiness remained unknown for a certain amount of time after having been encountered by at least one organization within the plurality of different organizations;
collecting information about the computing resource while the computing resource's trustworthiness remained unknown; and after collecting the information about the computing resource, classifying the computing resource as clean or malicious; and the training module trains the trustworthiness classifier based at least in part on:
  the information about the computing resource collected while the computing resource's trustworthiness remained unknown; and
  the computing resource's classification as clean or malicious.

14. The system of claim 11, wherein:
the characteristic of the specific organization comprises a size of the specific organization; and
the selection module selects the subset of training data by selecting only training data that relates to organizations whose size is within a certain range of the size of the specific organization.

15. The system of claim 11, wherein:
the characteristic of the specific organization comprises a relation to the specific organization; and
the selection module selects the subset of training data by selecting only training data that has the relation to the specific organization.

16. The system of claim 11, wherein:
the characteristic of the specific organization comprises an industry of the specific organization; and
the selection module selects the subset of training data by selecting only training data that relates to organizations whose industry is the same as the industry of the specific organization.

17. The system of claim 11, wherein:
the characteristic of the specific organization comprises a geographic region of the specific organization; and
the selection module selects the subset of training data by selecting only training data that relates to organizations whose geographic region is the same as the geographic region of the specific organization.

18. A non-transitory computer-readable medium comprising one or more computer-executable instructions that, when executed by at least one processor of a computing device, cause the computing device to:
  identify a set of training data that is available for training trustworthiness classifiers used by a security software product to classify computing resources as clean or malicious, wherein:
    the set of training data comprises at least one of:
      data that is collected from a plurality of different organizations; and
      data that is specific to a plurality of different organizations;
    identifying the set of training data comprises:
      identifying at least one computing resource whose trustworthiness remained unknown for a certain amount of time after having been encountered by at least one organization within the plurality of different organizations;
      collecting information about the computing resource while the computing resource's trustworthiness remained unknown; and
      after collecting the information about the computing resource, classifying the computing resource as clean or malicious;
  identify a specific organization whose computing systems implement the security software product;
  select, based at least in part on a characteristic of the specific organization, a subset of training data from the set of training data that is available for training trustworthiness classifiers;
  train a trustworthiness classifier for the specific organization using:
    the subset of training data selected based at least in part on the characteristic of the specific organization;
    the information about the computing resource collected while the computing resource's trustworthiness remained unknown; and
    the computing resource's classification as clean or malicious; and
  apply, by way of the security software product, the trustworthiness classifier to at least one computing resource encountered by the specific organization to classify the computing resource as clean or malicious.

19. A non-transitory computer-readable medium comprising one or more computer-executable instructions that, when executed by at least one processor of a computing device, cause the computing device to:
  identify a set of training data that is available for training trustworthiness classifiers used by a security software product to classify computing resources as clean or malicious;
  identify a specific organization whose computing systems implement the security software product;
  select, based at least in part on a characteristic of the specific organization, a subset of training data from the set of training data that is available for training trustworthiness classifiers, wherein the subset of training data identifies static features of known clean and malicious computing resources;
  train a trustworthiness classifier for the specific organization using:
    the subset of training data selected based at least in part on the characteristic of the specific organization; and
    the static features of the known clean and malicious computing resources;
  apply, by way of the security software product, the trustworthiness classifier to at least one computing resource encountered by the specific organization to classify the computing resource as clean or malicious;
  determine, by applying the trustworthiness classifier to the computing resource, that the computing resource is likely malicious; and
  substantiate that the computing resource is likely malicious by observing at least one suspicious run-time behavior of the computing resource while running within a software automation environment.

* * * * *